:US006402826B1

(12) United States Patent
Yuan et al.

(10) Patent No.: US 6,402,826 B1
(45) Date of Patent: *Jun. 11, 2002

(54) KAOLIN CLAY PIGMENT FOR PAPER COATING AND METHOD FOR PRODUCING SAME

(75) Inventors: Jun Yuan, Millegeville; Christopher R. L. Golley, Sandersville, both of GA (US); Christopher Nutbeem, Cornwall (GB); Rajan R. Iyer, Sandersville, GA (US); William H. Pope, Sandersville, GA (US); William L. Garforth, Sandersville, GA (US); Anthony V. Lyons, Macon, GA (US); Robert J. Pruett, Milledgeville, GA (US)

(73) Assignee: Imerys Pigments, Inc., Roswell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/451,109

(22) Filed: Nov. 30, 1999

Related U.S. Application Data

(60) Provisional application No. 60/110,303, filed on Nov. 30, 1998.

(51) Int. Cl.$^7$ .......................... C09C 1/42; D21H 19/40
(52) U.S. Cl. ...................... 106/486; 106/416; 106/484; 162/181.8; 241/24.1; 241/16
(58) Field of Search ................................ 106/416, 486, 106/487, 484; 162/181.8; 241/24.1, 16

(56) References Cited

U.S. PATENT DOCUMENTS

| | | |
|---|---|---|
| 4,227,920 A | 10/1980 | Chapman et al. |
| 4,381,948 A | 5/1983 | McConnell et al. |
| 4,943,324 A | 7/1990 | Bundy et al. |
| 5,085,707 A | 2/1992 | Bundy et al. |
| 5,112,782 A | 5/1992 | Brown et al. |
| 5,168,083 A | 12/1992 | Matthews et al. |
| 5,169,443 A | 12/1992 | Willis et al. |
| 5,411,587 A | 5/1995 | Willis et al. |
| 5,645,635 A * | 7/1997 | Behl et al. ................. 106/486 |
| 5,685,900 A | 11/1997 | Juan et al. |
| 5,749,958 A | 5/1998 | Behl et al. |
| 6,149,723 A * | 11/2000 | Pruett et al. ................. 106/486 |

OTHER PUBLICATIONS

Clay Minerals Society Homepage, http://cms.lanl.gov/instruct.html, "Instructions for Authors, Clays and Clay Minerals," Instructions for Authors, p. 4 of 5, (No Date).

* cited by examiner

*Primary Examiner*—Michael Marcheschi
(74) *Attorney, Agent, or Firm*—Finnegan, Henderson, Farabow, Garrett & Dunner

(57) ABSTRACT

A kaolin clay pigment comprises a coarse kaolin clay or a blend of a coarse kaolin clay with a fine kaolin clay. The coarse kaolin clay is a delaminated and defined pigment product with an overall shape factor greater than about 12. If the coarse kaolin clay is fluid at about 65% to about 75% solids, then it is used by itself as the kaolin pigment. If it is not fluid, it is blended with a fine kaolin clay in amounts ranging from about 0.1% to about 30.0% by weight of the blend. The coarse kaolin clay fraction has a Hinckley Crystallinity Index greater than about 0.6 and the fine kaolin clay has a Hinckley Crystallinity Index less than about 0.5. The pigment has a G.E. brightness of about 90.5 and a particle size distribution such that at least about 90% by weight of the particles has an e.s.d. less than about 2 $\mu$m and about 30% by weight of the particles has an e.s.d. less than about 0.25 microns. At about 65% to about 75% solids, the Hercules viscosity is greater than 250 rpm at about 18 dynes and when used in a coating formulation, exhibits improved sheet brightness, sheet gloss, sheet opacity and print gloss.

41 Claims, No Drawings

KAOLIN CLAY PIGMENT FOR PAPER COATING AND METHOD FOR PRODUCING SAME

RELATED APPLICATIONS

The following identified U.S. patent applications are relied upon and are incorporated by reference in this application.

Provisional U.S. Patent Application No. 60/110,303, entitled "Kaolin Clay Pigment for Paper Coating and Method for Producing Same," filed on Nov. 30, 1998.

BACKGROUND

1. Field of the Invention

This invention relates generally to kaolin clays and, in particular, to a kaolin clay pigment comprising a coarse kaolin clay or a blend of a coarse kaolin clay and a fine kaolin clay having specially designed particle size, particle shape, and crystal structure. The new pigment possesses improved rheological properties, i.e., Hercules viscosity that is greater than about 250 rpm at 18 dynes in a high solids clay-water slurry, i.e., about 65% to about 75% solids. When used in a coating formulation for coating groundwood or free sheet papers, the pigment provides improved physical and optical properties for the papers.

2. Background of the Invention

Kaolin clay pigments can be used to coat paper. The purpose of paper coating is to cover an irregular paper surface comprised of cellulose wood fiber with a pigment-binder formulation, that, when dry, leaves a smoother and brighter surface ready for printing. It is common practice to use kaolin clay along with other mineral pigments, such as titanium dioxide and calcium carbonates, as a coating in a coating formulation comprising starch and/or latex.

Kaolin clay pigments are obtained from kaolin which is also called china clay or hydrous kaolin. Kaolin comes from weathering, hydrothermal, and sedimentary geological deposits. Major kaolin deposits that are suitable for paper-making applications are found in the United States, Brazil, Australia, and the United Kingdom.

Kaolin is a type of rock formed through weathering or hydrothermal alteration of feldspar or mica minerals to kaolin minerals, or a sedimentary rock containing a high concentration of kaolinite particles or grains. Sedimentary kaolin rocks contain mostly clay or silt sized particles of kaolin minerals and fine and coarse particle size impurities. While the primary mineral in kaolin is kaolinite, a hydrated aluminum silicate ($Al_2Si_2O_5(OH)_4$), kaolin also contains impurities. These impurities are undesirable in many industrial applications. Some of the impurities (e.g., fine ferruginous or titaniferous impurities) impart undesirable color to the clay. Other impurities have an undesirable effect on the rheology of the kaolin. Still other impurities are coarse particles called "grit" that are generally above 45 microns which may cause scratching and/or abrasion if used in most applications. Kaolins from different deposits, or even from different parts of the same deposit, can vary widely in the amount and type of impurities as well as particle size distribution and the shape of the kaolin particles.

Kaolin particles occur over a range of sizes and aspect ratios. The particle size of kaolin is conventionally determined by sedimentation using Stokes Law and assuming a spherical particle shape for the kaolin particles. The conventional term "equivalent spherical diameter" (e.s.d.) is used to designate particle size. Aspect ratio is defined as the diameter of a kaolin particle divided by its thickness. Thus, unrefined (crude) kaolin will not contain particles of a single size, such as, for example, particles all of which are 2 microns. Typically, after degriting removes the majority of particles larger than 45 micron particles, the degritted kaolin will contain particles ranging in size from submicron (colloidal) to particles 20 microns or larger. Kaolin particles finer than about 1 micrometer are generally composed of individual platelets, but these platelets generally conglomerate into particles larger than about 1 micrometer. These conglomerate particles are usually composed of stacks or booklets of several platelets mixed with discrete platelets.

Kaolin clay pigments are widely used to coat and/or fill paper products. They can reduce the cost of the paper products and improve their quality by making the paper brighter, smoother, glossier, and easier to print ink onto. By altering the particle size and particle shape of kaolin pigment, one can change the impact of a kaolin clay pigment on the paper products. For use in paper coating applications, kaolin pigments generally need to have 80% or more particles that are less than 2 micrometers (e.s.d.).

Changing Clay Particle Size and Shape by Delamination

One technique to change clay particle size and shape is mechanical delamination of the kaolin particles. Delamination is the process of splitting apart kaolinite stacks or booklets into largely individual platelets. One type of delamination operation involves subjecting the naturally occurring kaolin stacks to shearing forces in an extruder, thereby reducing the kaolin stacks to discrete platelets. An alternative delamination process involves subjecting the naturally occurring kaolin stacks in an aqueous clay slurry to the cleaving or shearing action of an attrition mill or a sand grinder. Reference may be made to U.S. Pat. No. 3,615,806 of Andrew Torock and Thomas F. Walsh for a thorough discussion of the process of delamination of kaolin clay. Kaolin pigments which are delaminated can be used in paper coating to improve the opacity as well as enhance the smoothness of the paper surface. See, for example, U.S. Pat. No. 3,171,718, to Gunn et al and U.S. Pat. No. 4,241,142, to Kaliski et al.

However, delamination is generally detrimental to the fluidity of kaolin pigments in high solids clay-water slurries. Good fluidity at high solids concentration is very desirable and often necessary for kaolin pigments in their paper-coating applications. Superior rheology in coating formulations permits the paper coating equipment to run at higher speeds (which directly increase the productivity of existing coating equipment) or permits the use of coating formulations at higher solids (thus reducing drying time and hence increasing the efficiency of drying equipment). Delaminated kaolin pigments have substantially poorer fluidity (i.e., higher viscosity) at high-shear rate than undelaminated pigments in a clay-water slurry or in paper coating formulatons. Typically, delamniated kaolinpigments are fluid at 65–68% solids concentration compared with undelaminated kaolin pigments which are typically fluid at 70% solids concentration or higher. Small changes in water content, such as the larger water content in a 65–68% solids-concentration slurry rather than the 70% solids-concentration slurry, may have a significant impact on paper manufacturing. This is because 2% or greater change in water content will vary the balance in coating formulations, detrimentally effecting the coloring process and thereby reducing the final paper product's quality (opacification as well as other desired quality traits). Also, higher water contents increase the cost of the final colored paper because of higher drying costs. Lastly, if any adjustments need to be made to the color formulation these adjustments can be more expensive with a lower solids-concentration slurry because, while it is inexpensive to later increase the water content of the slurry, decreasing it can be difficult and expensive, especially with high solids-content slurries. Thus, with the use of conventional delaminated pigments, papermakers must balance the tradeoff between paper opacification (quality) and efficiency of production (productivity).

It is well known in the art that kaolin clay pigments must have certain rheological and optical properties to be suitable for use in paper manufacture as paper coatings or paper fillers. The kaolin pigment must be available as a high solids suspension typically having a clay solids content of about 50% to 70% by weight, but still exhibiting a viscosity low enough to permit efficient and economical pumping, mixability with other filler or coating components, and application to the paper. Additionally, it is of utmost importance that the kaolin pigment exhibit certain optical. properties, namely high brightness, high gloss, and high opacity.

U.S. Pat. No. 5,411,587, to Willis et al., disclosed a novel mechanically delaminated kaolin clay pigment useful for light weight coated paper which possesses the opacification, smoothness and printability characteristics of conventional delaminated kaolin pigment, but which exhibits low viscosity and gloss not characteristic of conventional delaminated kaolin pigments. This reference teaches subjecting the crude kaolin clay to delamination and terminating delamination when a certain level of particle size change is achieved. Unfortunately, the reference shows product made only with special crude clays from a very selected part of the world; the Capim River Basin of Brazil. Additionally, the performance of this pigment on coated paper is not significantly better than conventional delaminated pigments.

Changing Clay Particle Size and Shape by Defining/Desliming

Another processing technique often used to alter particle size distribution is defining or desliming. A "defining" process generally refers to the operation of separating and discarding a percentage of the fine fraction of a kaolin suspension. The defining operation can be carried out in one or more centrifuges where the kaolin suspension to be "defined" is supplied to the centrifuges and processed to separate the suspension into a coarser fraction and a finer fraction. A selected percentage (by volume) of the finer fraction is discarded. The "percent defining level" refers to the volume percentage of the finer fraction that is discarded. For example, defining to a level of 40% means; that 40% of the finer fraction from the centrifuge was discarded and the 60% remaining coarser fraction from the centrifuge was kept as product for further processing. The defining process produces kaolin pigments with a narrower particle size distribution, which is especially advantageous when used in lightweight coated paper for rotogravure and offset printing.

For example, in U.S. Pat. No. 2,992,936, Rowland discloses that a kaolin clay product having the following particle size distribution (in terms of equivalent spherical diameter, e.s.d.) will consistently show improved brightness, gloss and opacity when used as a paper coating clay:

99–100% by wt. less than 5 microns e.s.d.
98–100% by wt. less than 4 microns e.s.d.
88–100% by wt. less than 1.7 microns e.s.d.
85–87% by wt. less than 1.5 microns e.s.d.
70–84% by wt. less than 1.0 microns e.s.d.
25–37% by wt. less than 0.5 microns e.s.d.
10–15% by wt. less than 0.3 microns e.s.d.

In U.S. Pat. No. 5,085,707, Bundy et al. discloses a defined and delaminated kaolin composition which functions superiorly in paper coating formulations, alone or blended with known coating clays, to improve the opacity, print gloss, sheet gloss, and printability of paper sheet coated therewith.

However, it is also known in the art that defining or desliming is very detrimental to the high shear rheology of kaolin pigments and their coating formulations. Defined pigments tend to yield significantly greater dilatant characteristics and therefore can only be handled at lower solids concentrations than typical undefined pigments. (A dilatant material has a greater viscosity when stirred at a greater speed).

Because altering the particle size and particle shape of kaolin pigment can change the impact of a kaolin clay pigment on the paper products coating formulation, viscosity is a key issue in the art of coating paper, especially because manufacturers engaged in coating paper are facing tough constraints on their production capacity. A clay-water slurry has to be fluid at high. solids, e.g., about 60% to about 70% solids. If it is not fluid, the coating formulation viscosity has to be lowered, which reduces productivity. A clay-water slurry that has equivalent viscosity to a comparable slurry at only 2–3% higher pigment solids represents an improvement of significant commercial importance because of significant differences in quality and lost.

Some coating formulations involve a combination of different types of kaolin pigments, such as a certain percentage of calcined kaolin clay and a certain percentage of hydrous kaolin clay, which combination can result in "poor" dispersion of particles in that the two types of kaolin clay pigments may aggregate which may disrupt the coating structure, resulting in poor sheet optics, poor printability, or both. Additionally, many paper coating compositions comprise an abundance of fines (fine particles), which tend to affect the optical properties of the sheet by improving gloss at the expense of sheet brightness for some grades and opacity.

Generally, manufacturers of paper products seek to use pigments for coating made of clay which are capable of forming clay-water slurries at 70% solids, which have a low shear viscosity below 1000 cp, preferably below 500 cp, when measured by the Brookfield Viscometer at 20 rpm. High shear viscosity is considered of special importance in evaluating a high-solids pigment slurry for coating purposes. The more fluid the slurry, the higher the rpm that the Hercules Viscometer records at 18 dynes/cm $10^{-5}$. High shear viscosity for these slurries should be no less than 250 rpm, preferably 500 rpm or better, using the "A" bob. It is especially important that the shear viscosity be above 200, as special equipment is needed to pump slurries with viscosities below 200. Those skilled in the art are aware that when using the Hercules Viscometer and measuring end points of 1100 rpm or higher, viscosity is reported in units of dynes/cm $10^{-5}$ at 1100 rpm. It is conventional to use the abbreviated term "dyne". A "2 dyne" clay slurry is less viscous than a "9 dyne" clay slurry at a given solids level.

As stated previously, there is a need in the industry for an improved kaolin clay coating pigment with low viscosity at a high solids concentration and overall improved optical and printing properties for coated papers. These properties include improved gloss, opacity, brightness, smoothness, and printability.

SUMMARY OF THE INVENTION

The present invention has met this need. The present invention provides a kaolin clay pigment with a controlled particle size distribution and a shape factor preferably greater than about 12 and, more preferably, ranging between about 12 and about 20. This pigment comprise a coarse kaolin clay or a blend of a coarse kaolin clay and a fine kaolin clay component, the fine kaolin clay component ranging from about 0.1 to about 30% by weight, and preferably about 10% by weight, of a blend containing fine kaolin clay. The total color formulation, coarse clay pigment only or with a fine clay pigment, should have a surface area of at least about 12.6 m$^2$/g or more (BET method using $N_2$ as adsorbent), preferably about 12.6 to about 23, more preferably about 13 to about 20, most preferably about 14 to about 20.

The coarse clay is made by processing a coarse crude kaolin clay by: 1) removing some of the titanium impurities if necessary; 2) size-fractioning the clay; 3) grinding the clay; and, optionally, 4) defining or desliming the clay. The titanium impurities may be removed by a floatation process, a selective flocculation process, a magnetic separation process, or a combination of any of these processes. Preferably, the titanium removal is done through a selective flocculation process or a superconducting magnetic separation process (with or without chemical additives). The step for removing unwanted fine particles, the defining step, is used to remove undesirable platy fine particles at the finer end of the particle size spectrum. Defining levels range from about 10% to about 30%. Other conventional processing steps such as de-watering, bleaching and drying may also be included with the above steps. The coarse kaolin clay pigment can be processed as above to have a TAPPI (G.E.) brightness of at least about 89.0, an average shape factor of greater than about 12, and a steep particle size distribution such that at least about 90% by weight of the particles have an equivalent spherical diameter (e.s.d.) less than about 2 microns and not more than about 30% by weight of the particles have an equivalent spherical diameter less than about 0.25 micron. The coarse kaolin clay is preferably produced by a defining process where the fine fraction is generally discarded and the coarse fraction is used in the present invention. The coarse kaolin clay is processed from feed material having a Hinckley Crystallinity Index greater than about 0.6.

The fine kaolin clay component of the pigment composition of the invention is characterized as being "fluid" and "blocky" and should have a shape factor less than about 12 and comprise individual thick platelets (i.e., blocky particles). The fine kaolin of the pigment composition of the invention preferably is made from a selective flocculation technique or a superconducting magnetic separation process with or without chemical additives to improve titanium removal, has a TAPPI brightness of at least about 89.0, and has a particle size distribution such that at least about 90% by weight of the particles have an equivalent spherical diameter less than about 2 $\mu$m, and about 50% to about 75% by weight of the particles have an equivalent spherical diameter less than about 0.25 $\mu$m.

The fine kaolin clay component of the invention is processed from a kaolin feed material with a Hinckley Crystallinity Index less than about 0.5.

The kaolin clay pigment of the invention, whether it comprises coarse kaolin clay only or a blend of a coarse kaolin clay and a fine kaolin clay, preferably has a shape factor greater than about 12. The clay particles of this pigment have a G.E. brightness of about 89.0 or greater; and a steep particle size distribution (p.s.d.) such that at least about 91% by weight of the particles have an equivalent spherical diameter (e.s.d.) less than about 2 microns and not-more than about 30% by weight of the particles have an equivalent spherical diameter (e.s.d.) less than about 0.25 $\mu$m. If the coarse kaolin clay does not provide these physical properties, then the fine kaolin clay component is blended with the coarse clay in an amount ranging from about 0.1% to about 30.0% by weight to produce these desired physical properties in the pigment of the invention.

The kaolin clay pigment of the invention is capable of forming a high solids coating clay slurry with "good" fluidity, i.e., a Hercules viscosity greater than 250 rpm at 18 dynes at a solids ranging from about 65% to about 75%.

When the kaolin clay pigment in slurry form is used in a coating formulation to coat groundwood or free sheet, it yields superior sheet brightness, sheet gloss, sheet opacity, and print gloss when compared to a commercially available kaolin clay product or blend. For example, as a coating, the kaolin clay pigment of the invention gives a TAPPI (G.E.) brightness gain ranging from about 0.1 and about 2 units, a sheet gloss gain ranging from about 0.1 and about 4.0 TAPPI units, a sheet opacity gain ranging from about 0.1 to about 1.0 TAPPI unit, and a print gloss grain (measured from 75°) ranging from about 0.1 to about 8 units.

Although known that delamination and defining produce a kaolin pigment with enhanced properties for use in paper manufacture, the precise mechanism of achieving the optimal combination of paper coating performance and productivity remains unknown. By using shape factor as a control for delamination, coupled with designed particle size distribution, it has been surprisingly discovered that a pigment can be made to have low viscosity characteristics as well as enhanced paper coating performance. In addition, although it may be known in the art to blend a coarse fraction kaolin with a fine fraction kaolin to improve rheology, that type of conventional blending yields excessive amounts of ultrafine particles that are often detrimental to paper coating properties. Additionally, it has not been known to remove the fine particle fraction of a coarse kaolin clay and replace it with a blocky fine kaolin clay whereby a shape factor control is used to achieve the desired rheology of a high solids coating slurry.

Therefore, it is an object of the present invention to provide a kaolin clay pigment for coating groundwood or free sheet paper grades having improved rheological properties for a high solids concentration in a water-clay slurry with improved physical and optical properties in the coated sheet.

It is a further object of the present invention to provide a coating formulation composition for lightweight printed paper, such as groundwood and free sheet paper grades, including a kaolin clay pigment which is comprised either of a coarse kaolin clay or of a blend of a coarse kaolin clay and a fine kaolin clay whereby the kaolin clay pigment has a controlled particle size distribution and a shape factor greater than about 12.

It is a further object of the present invention to provide a method for producing a kaolin clay pigment for coating lightweight paper with improved rheological properties and paper coating properties.

It is a further object of the invention to provide a coating composition comprising a kaolin clay pigment comprised of a coarse kaolin clay or a blend of a coarse clay and a fine blocky clay which forms a high solids slurry which has "good" fluidity and low viscosity with improved gloss values on coated sheet.

These and other objects of the present invention will be better appreciated and understood in reading the detailed description of the preferred embodiments.

DETAILED DESCRIPTION OF THE INVENTION

The kaolin clay pigment of the invention generally comprises a kaolin clay product which is a coarse kaolin clay or a blend of this coarse kaolin clay admixed with a fine kaolin clay, both of which are preferably processed from a sedimentary kaolin, such as a Georgia Kaolin. Beneficiation generally refers to the treatment or processing of kaolin. In the present invention, the coarse kaolin clay is processed from a well crystallized kaolin feed material containing low-defect kaolinite with a Hinckley Crystallinity Index greater than about 0.6, and the fine kaolin clay is processed from a poorly crystallized kaolin feed material containing high-defect kaolinite with a Hinckley Crystallinity Index less than about 0.5.

The Hinckley Crystallinity Index was developed in 1963 by D. N. Hinckley to describe how well a crystal structure of a kaolinite is ordered. Reference is made to "Variability In Crystallinity Among The Kaolin Deposits Of The Coastal Plains Of Georgia And South Carolina" by D. N. Hinckley in Clays And Clay Minerals, 1963, vol. 11, 229–235.

The coarsekaolin of the kaolin lay pigment of the invention preferably is produced by the following process.

A coarse crude kaolin clay with a Hinckley Crystallinity Index-greater than about 0.6 is blunged in water with sodium silicate or sodium hexametaphosphate as a dispersion agent to form an aqueous slurry having a solids level ranging from about 50% to about 70% by weight, and preferably about 60% solids by weight. Other dispersing agents can be used, such as, for example, soda ash, sodium polyacrylate, and other dispersants equivalent to sodium silicate or sodium hexametaphosphate. The clay is degritted, i.e. the coarse particles in the kaolin above about 45 microns are removed by passing the slurry through a series of screens. The impurities, including iron and/or titania impurities, are removed from the kaolin clay through flotation, magnetic separation, selective flocculation, or two or more of these processes.

In the flotation process, the slurry is conditioned with an oleic acid which coats the air bubbles produced in the float cells. The titania minerals adhere to the air bubbles and are floated out of the kaolin slurry. An example of such a flotation process is described in U.S. Pat. No. 3,450,257, to Cundy, which is herein incorporated by reference. This process results in an improved brightness in the kaolin pigment, i.e., a brightness gain ranging from about 0.1 to about 3 units. In the magnetic separation process, a standard high intensity wet magnetic separator is used to remove the iron-bearing minerals from the clay slurry, which also results in a brightness gain ranging from about 0.1 to about 3.0 units. In the selective flocculation process, a high molecular weight anionic polymer having a preferred molecular weight in excess of one million and a more preferred molecular weight. in the range of about 10 to about 15 million is used. The anionic polymer is preferably a copolymer of a polyacrylamide or polyampholyte. Details of the particular selective flocculation process may be referred to U.S. Pat. No. 4,227,920, to Chapman and Anderson. U.S. Pat. No. 5,685, 900 to Yaun et al., which is incorporated herein by reference in its entirety, discloses a preferred selective flocculation process that includes ozonation.

After impurity removal, the clay is subjected to a Bird centrifuge where the clay is classified to a particle size distribution such that generally about 89% to about 96% by weight of the particles have an e.s.d. less than 2 µm.

After classification in a Bird centrifuge, the clay is subjected to a delamination process. Delamination, as used herein and as discussed hereinabove, refers to the operation of subjecting the naturally occurring kaolin stacks in the aqueous clay slurry to shearing forces thereby reducing the number of kaolin stacks and forming discrete platelets. In each example presented herein, delamination was carried out by subjecting the aqueous slurry of stacked kaolin particles to shearing action in a sand grinder. In the examples, the kaolin slurry was introduced into the sand grinder at about 4 gallons per minute to produce a particle size distribution such that about 92% to about 97% by weight of the particles had an equivalent spherical diameter less than about 2 µm.

The kaolin slurry is then subjected to a defining step. In each example presented herein, the defining step was carried out in a centrifuge. The kaolin slurry was transferred to the centrifuge and processed to separate the suspension into a coarse fraction and a fine fraction. In the invention, this fine fraction generally is discarded because the inventors have found that this fine fraction generally contains a large percentage of platy particles which caused the slurry to be highly viscous. This fine fraction generally consists of a great amount of ultrafine particles, i.e., less than about 0.25 microns. Removal of these ultrafines is referred to as a desliming step. If the defined kaolin slurry, which is now coarse, is fluid, i.e., Hercules viscosity greater than about 250 rpm at 18 dynes, at about 65% to about 75% solids concentration, then it alone is the product of the invention. If the defined coarse kaolin is not fluid, i.e., Hercules viscosity is less than about 250 rpm at 18 dynes, at about 65 to about 75% solids, then a component of very fluid and blocky fine kaolin clay is added to the defined coarse kaolin. As used herein "very fluid" refers to a material that remains fluid at at least about 72% solids content. This fine kaolin clay component is made preferably using a selective flocculation or a magnetic separation process. The inventors discovered that by replacing the platy fine particles removed from the coarse kaolin in the defining step with the blocky and fluid fine kaolin clay, the composite slurry attains the desired improved rheological properties.

In one embodiment of the invention the coarse kaolin clay alone is used as the kaolin clay pigment of the invention.

Further processing of this coarse kaolin clay may involve leaching and filtering. These processes are well known to those skilled in the art and are standard processes to improve kaolin clay.

The coarse kaolin clay produced as discussed hereinabove preferably has the physical properties shown in Table 1.

TABLE 1

| | |
|---|---|
| Solids, % | 65%–75% |
| Brookfield Viscosity, #2 Spindle @ 20 rpm | 200 cps or ≧ |
| Hercules Viscosity, @ 18 dynes | ≦1200 rpm |
| Particle Sized Distribution: | |
| % < 10 µ | 99.6–99.9 |
| % < 5 µ | 99.7–99.8 |
| % < 2 µ | 90–96 |
| % < 1 µ | 73–82 |
| % < 0.5 µ | 49–58 |
| % < 0.25 µ | 15–30 |
| Brightness (G.E.) | 89.0–92.0 |
| b-value | 2.66 |
| $TiO_2$% | 0.728 |
| $Fe_2O_3$% | 0.266 |
| Particle Shape Factor | 12–25 |

From Table 1 it can be seen that the G.E. brightness of the kaolin clay is at least about 89.0, the particle size distribution is such that at least about 90% by weight of the particles have an equivalent spherical diameter less than about 2 μm, and not more than about 30% by weight of the particles have an equivalent spherical diameter less than about 0.25 μm. As stated above, this coarse kaolin clay generally will have a high percentage of "blocky" particles at the coarse end and a small amount of "platy" particles at the fine end and the shape factor of the whole clay will be greater than about 12, and preferably ranging from about 12 to about 25. It will be discussed in greater detail below.

The coarse kaolin clay of Table 1 sometimes produces a viscous, low fluidity slurry for a high solids coating application, which may be unsatisfactory to papermakers. In order to obtain a desired rheology for the slurry, according to the teachings of the invention and as discussed, another embodiment of the invention includes adding a fine kaolin clay to the slurry, which may be made using a selective flocculation process.

A suitable fine kaolin clay component for use in the invention may be produced according to the teachings of U.S. patent application Ser. No. 08/876,523, filed on Jun. 16, 1997, entitled "Method For Separating Mixtures of Finely Divided Minerals and Product Thereof." This application is now U.S. Pat. No. 6,068,693, issued May 30, 2000, William L. Garforth et al. It is assigned to the assignee of the present invention, and incorporated herein by reference.

A blocky crude kaolin clay with a Hinckley Crystallinity Index less than about 0.5 is blunged and dispersed at a slurry solids content of about 50 to about 70% by weight. The dispersants are a combination of sodium hexametaphosphate and sodium silicate. The dispersed clay slurry is passed through a high shear mixer and then degritted to remove 100+ mesh particles. After fully dispersing and degritting the clay slurry, the slurry is diluted to about 20 to about 40% solids, preferably about 30% solids by weight.

This diluted slurry is metered into a high intensity wet magnetic separator for removal of the iron-bearing impurities. The product from this process is then diluted to about 25% solids by weight and the impurities are discarded.

The diluted slurrry at about 25% solids is then treated with about 10 to about 25% by weight sodium chloride solution added at a rate of about 5 to about 40 lbs./dry ton clay, with about 20 lbs./dry ton clay being typical. The diluted slurry is subjected to a selective flocculation process. In this process, the diluted slurry is treated with a high molecular weight anionic polymer in a dosage of about 0.01 to about 0.5 lbs./dry ton of clay in a 0.02 to 0.1% solution. The high molecular weight anionic polymer preferably has a molecular weight in excess of one million, and more preferably has a molecular weight in the range of about 10 to about 15 million. The anionic polymer may be any one of those commercially available and is preferably a copolymer of a polyacrylamide.

In this selective flocculation process, the impurities are flocced out of suspension while the kaolin clay remains in suspension. The refined clay slurry may be ozoned, bleached, and/or filtered, followed by either redispersing in a makedown tank or alternately spray dried.

The fine kaolin clay component produced by the above process has a TAPPI brightness greater than about 89.0, preferably ranging from about 90.0 to about 93 and a rheology of less than about 10 dynes at 4400 rpm at 70% solids, a particle size distribution (p.s.d.) such that about 95% by weight of the particles have an e.s.d. less than about 2 microns, and about 50 to about 75% by weight of the particles have an e.s.d. less than about 0.25 micron.

In a second aspect of the invention, this fine kaolin clay component is used, when necessary, by blending it with the coarse clay in amounts ranging from about 0.1% to about 30.0% by weight of the blend to give a rheology of about 18 dynes at 250 rpm or better at about 65 to about 75% solids. This bland will have a shape factor greater than 12, and preferably ranging between about 12 and about 25.

The fine kaolin clay component, either in dry form or in slurry form, is blended with the coarse kaolin clay either in slurry form or in dry form. The amount of the fine kaolin clay will range from about 0.1% by weight to about 30% by weight of the solids, more preferably between about 5% to about 25% by weight, and most preferably about 7% to about 13% by weight of the solids. Preferably, the solids in the slurry will range from about 65% to about 75% by weight of the slurry. In dry form, the kaolin clay particles are blended together in slurry form and then spray dried.

In the invention, the coarse kaolin clay is optionally combined with the fine kaolin clay to produce a kaolin clay pigment where the ratio of % finer than about 2 microns (e.g., 92%) divided by the % finer than about 0.25 micron (e.g., 30%) is equal to or greater than 3. The kaolin clay pigment of the invention preferably has a particle size distribution "p.s.d." such that at least about 90% by weight of the particles have an e.s.d. smaller than about 2 μm and not more than about 30% by weight of the particles have an e.s.d. smaller than about 0.25 μm. This pigment is fluid at high solids concentration, i.e., 65–75% solids. The shape factor for the pigment ranges from about 12 to 25, more preferably from about 13 to about 18 and most preferably about 15.

A kaolin product of high shape factor is considered to be more "platy" than a kaolin product of low shape factor. "Shape factor" as used herein is a measure of an average value (on a weight average basis) of the ratio of mean particle diameter to particle thickness for a population of particles of varying size and shape as measured using the electrical conductivity method and apparatus described in U.S. Pat. Nos. 5,128,606 and 5,576,616, and using equations derived in these patent specifications, each of which is incorporated herein by reference. "Mean particle diameter" is defined as the diameter of a circle which has the same area as the largest face of the particle. In the measurement method described in U.S. Pat. No. 5,128,606, electrical conductivity of a fully dispersed aqueous suspension of the particles under test is caused to flow through an elongated tube. Measurements of the electrical conductivity are taken between (a) a pair of electrodes separated from one another along the longitudinal axis of the tube, and (b) a pair of electrodes separated from one another across the transverse width of the tube, and using the difference between the two conductivity measurements the shape factor of the particulate material can be determined.

As will be appreciated by those skilled in the art, the particle-size distribution (p.s.d.) of a particular product, such as the kaolin clay pigment of the invention, may be determined by measuring the speeds at which the dispersed particles of the particular clay sediments while under testing. This testing may be performed using a standard dilute aqueous suspension using a Sedigraph™ machine, e.g., Sedigraph 5100, obtained from Micromeritics Corporation, U.S.A. The sizes of the particles are expressed in terms of the diameter of a sphere of equivalent diameter which sediments through the suspension and is expressed as equivalent spherical diameter, or e.s.d. The Sedigraph™ machine graphically records the percentage by weight of particles having e.s.d. less than a certain e.s.d. value versus another e.s.d.

The invention uses the art rocognized BET method using $N_2$ as the adsorbate to determine the surface area.

The kaolin clay pigment of the invention has particular application in a coating formulation in coating groundwood or free sheet printed paper. As such, the coating composition generally is in the form of an aqueous suspension or slurry and comprises the kaolin clay pigment of the invention, a hydrophilic adhesive or binder, a latex, a cross-linker, an insolubilizer and an optical brightening agent (OBA).

The binder level may range from, e.g., about 4% by weight to about 20% by weight, and may comprise an adhesive derived from natural starch obtained from a known plant source, for example, wheat, maize, etc., or could be starch. The latex level may range from about 4% by weight to about 20% by weight and may be selected from the group consisting of styrene butadiene, acrylic latex, vinyl acetate latex, or styrene acrylic copolymers.

The insolubilizer level may be up to about 2% by weight.

The cross-linker level may be up to about 5% by weight and selected from the group consisting of glyoxals, melamine formaldehyde, resins, and ammonium zironcium carbonates. The optical brightening agent level may be up to about 1% by weight. The agent used may be stilbene derivatives, among others. For the above additives, the percentages by weight are based on the dry weight of pigment (100%) present in the composition.

Typically, the coating comprising the kaolin clay pigment of the invention may be applied to the base paper to coat the paper which is then calendered to form the gloss coating thereon. The coating may be formed on one side or on both sides of the paper, and preferably is added on both sides.

Calendering is a well known process in which paper smoothness, gloss, and printed gloss are improved and bulk is reduced by passing a coated paper sheet between calender nips or rollers one or more times. Usually, elastomer coated rolls are employed to give pressing of high solids compositions. An elevated temperature may be applied. Five or more passes through the nips may be applied.

The paper after coating and calendering may have a total weight per unit area in the range about 30 $g.m^{-2}$ to about 70 $g.m^{-2}$, with preferred ranges of about 49 $g.m^{-2}$ to about 65 $g.m^{-2}$ and about 35 $g.m^{-2}$ to about 48 $g.m^{-2}$. The final coating preferably has a weight per unit area preferably from about 3 $g.m^{-2}$ to about 20 $g.m^{-2}$, more preferably from about 5 $g.m^{-2}$ to about 13 $g.m^{-2}$. Such a coating may be applied to both sides of the paper. The paper gloss may range from about 50 to about 90 TAPPI units at 75 degree angle of measurement, the print gloss may range from about 20 to about 60 TAPPI units at 20 degree angle of measurement and about 85 to about 100 TAPPI units at 75 degree angle of measurement, and the Parker Print Surf value at a pressure of 1 mPa of each paper coating may be less than about 1 $\mu$m.

The brightness of the pigments are determined in the conventional manner (TAPPI Standard T 452 m-58) using a U.S. Brightness Meter.

The gloss of a coated paper surface may be measured by means of a test laid down in TAPPI Standard No. 480 ts-65. The intensity of light reflected at an angle from the surface of the paper is measured and compared with a standard of known gloss value. The beams of incident and reflected light are both at an angle of 750° to the normal to the paper surface. The results are expressed in TAPPI gloss units.

The print gloss of a coated paper surface may be measured through a standard TAPPI test. The intensity of light reflected at an angle from the surface of the paper is measured and compared with a standard known print gloss value. The beams of incident and reflected light are both at an angle of 20° or 75° to the normal to the paper surface. The results are expressed in TAPPI print gloss units. As an example in one coating formulation as a result of the invention, the coated sheet had a paper gloss ranging between about 77 to about 83, and a print gloss ranging from about 35 to about 60 at 20 degree angle of measurement.

The Parker Print Surf test provides a measure of the smoothness of a paper surface, and measures the rate at which air under pressure leaks from a sample of the coated paper which is clamped, under a known standard force, between an upper plate which incorporates an outlet for the compressed air and a lower plate, the upper surface of which is covered with a sheet of either a soft or a hard reference supporting material according to the nature of the paper under test. From the rate of escape of the air, a root mean cube gap in $\mu$m between the paper surface and the reference material is calculated. A smaller value of this gap represents a higher degree of smoothness of the surface of the paper under test.

The kaolin clay pigment of the present invention will be better appreciated, and the process for producing the clay pigment of the invention will be better understood with reference to the examples hereinafter which are to be regarded as illustrative, not limiting, of the present invention.

The following examples illustrate a kaolin clay pigment having the desired physical properties and exceptional advantages in coating applications of the present invention.

EXAMPLE 1

The invention is described in Examples 1, 2, and 3. In the first two examples no fine clays are added. Example 1 involves the use of flotation to produce a coarse kaolin clay pigment (Product A) having the characteristics shown in Table 1. A crude kaolin clay with a Hinckley Index of about 0.8 was blunged in water with sodium silicate to form an aqueous kaolin suspension as hereinbefore described. This suspension was then subjected to a froth flotation to remove titanium and other impurities in the froth. This slurry was then classified in a Bird centrifuge where the particles generally have a particle-size distribution of about 89–96% by weight less than 2.0 microns, and, in this Example 1, have a particle size distribution of 95% by weight and are less than 2.0 microns.

The classified kaolin suspension was subjected to determined in a sand grinder. The grinding medium in the sand grinder is of relatively high specific gravity and comprises grains of silica sand having diameters ranging from about 0.25 mm to 2.0 mm. The sand grinder comminuted the kaolinite particle stacks to give individual thin, substantially hexagonal plates. This process increased the shape factor of the kaolin clay to the preferred shape factor of 12 or greater. The kaolin suspension was then subjected to a defining step by centrifuging in a disc-nozzle centrifuge equipped with internal recycle manufactured by Dorr-Oliver Incorporated of Stamford, Conn. The fine fraction was discarded. The coarse fraction contained 17.8% by weight of fines, i.e., less than 0.25 micron. This coarse fraction in slurry form was subjected to leaching. After leaching, filtering (dewatering on a rotary vacuum dryer), rinsing, and redispersing, the coarse kaolin clay was admixed in a conventional manner with binders etc. and formed into a dispersed coating clay formulation commercially used for offset paper as discussed infra. It compared well with a top grade commercial kaolin pigment for coating.

The results are shown in Table 2.

TABLE 2

|  | Product A | Top Grade Commercial Pigment |
|---|---|---|
| Pigment Properties | | |
| Brightness (G.E.) | 91.4 | 91.1 |
| Particle Size - % < 2 μm | 93.0 | 92.0 |
| Particle Size - % < 0.25 μm | 17.8 | 21.0 |
| Shape Factor | 18.4 | 17.6 |
| BET (m$_2$/g) | 17.1 | 11.5 |
| Brookfield @ 20 rpm (c.p.s.) | 500 | 335 |
| Hercules @ 18 dynes (rpm) | 360 | 880 |
| % Solids | 70 | 70 |
| Offset Coated Sheet Properties | | |
| Brightness (G.E.) | 87.4 | 87.3 |
| Opacity | 93.4 | 93.0 |
| Gloss (75°) | 79.6 | 77.8 |
| Print Gloss (75°) | 86.2 | 84.7 |
| Parker Print Surf (PPS) | 0.75 | 0.84 |

As evident from Table 2, Product A exhibited improved brightness, opacity, gloss, print gloss, and PPS (smoothness) when compared to the commercial coating clay used in offset coating formulations. Also, the surface area of Product A was greater than that of the commercial coating clay, i.e., 17.1 BET surface area vs. 11.5 BET surface area.

EXAMPLE 2

This Example involved the use of selective flocculation to produce a coarse clay pigment (Product B) having the characteristics shown in Table 1. Crude kaolin clay with a Hinckley Index of about 1.0 was blunged in water similar to that of Example 1. After blunging, the suspension was subjected to a selective flocculation to remove the titanium containing impurities. In this selective flocculation, a high molecular weight anionic polymer, i.e., a copolymer of polyacrylamide, was used to floc out the pure kaolin while leaving the discolored impurities in suspension. The flocculated kaolin was mixed at a high shear rate and its suspension was subjected to ozonation, as described hereinabove, and then subjected to classification to produce a product with a p.s.d. of 93% by weight less than 2.0 microns, sand grinding to obtain a shape factor of at least 12 for the kaolin clay, defining, leaching and filtering under the same conditions as described in Example 1. As a result of the defining process, only 20% of the kaolin particles in the coarse fraction were less than 0.25 microns.

Similar to Example 1, Product B was incorporated into a coating formulation in a conventional manner commonly used for offset paper and compared to the top grade commercial pigment used in Example 1.

The results are shown in Table 3.

TABLE 3

|  | Product B | Top Grade Commercial Pigment |
|---|---|---|
| Pigment Properties | | |
| Brightness (G.E.) | 90.7 | 91.1 |
| Particle Size - % < 2 μm | 94.0 | 92.0 |
| Particle Size - % < 0.25 μm | 20.0 | 21.0 |
| Shape Factor | 15.4 | 17.6 |
| BET (m$_2$/g) | 14.1 | 11.5 |
| Brookfield @ 20 rpm (c.p.s.) | 688 | 335 |
| Hercules @ 18 dynes (rpm) | 165 | 880 |
| % Solids | 70 | 70 |
| Offset Coated Sheet Properties | | |
| Brightness (G.E.) | 84.5 | 84.4 |
| Opacity | 93.1 | 93.3 |
| Gloss (75°) | 81.3 | 80.6 |
| Print Gloss (20°) | 55.5 | 50.3 |
| PPS | 0.77 | 0.80 |

As evident from Table 3, Product B exhibited improved brightness, gloss, and print gloss when compared to the commercial coating clay in offset formulations. Also, the pigment of Product B had a greater surface area than the commercial coating clay, i.e., 14.1 BET surface area vs. 11.5 BET surface area.

EXAMPLE 3

In this example, unlike examples 1 and 2, the invention is shown with a blend of a coarse kaolin clay with a fine kaolin clay in accordance with the teachings of another embodiment of the invention.

A coarse kaolin clay (Product B of Example 2) was blended with a fine kaolin clay component. This fine kaolin clay component had a Hinckley Crystallinity Index of about 0.4 and was produced according to the teachings of the aforementioned U.S. Pat. No. 6,068,693.

These two kaolin clays were blended together in slurry form in the weight percent solids shown in Table 4 and then admixed in a coating formulation for evaluation in an offset process and compared to the top grade commercial coating clay of Examples 1 and 2. The particle shape factor for these blends of clays was greater than 12 as shown in Table 4. The coating formulation was the same as that used in Examples 1 and 2.

The results are shown in Table 4.

TABLE 4

| Blend # | 1 | 2 | 3 | 4 | | |
|---|---|---|---|---|---|---|
| Pigment Properties Of The Blends | | | | | | |
| % Coarse Kaolin Clay | 0% | 100% | 95% | 90% | 80% | Top Grade Commercial Pigment |
| % Fine Kaolin Clay | 100% | 0% | 5% | 10% | 20% | |
| Brightness (G.E.) | 91.0 | 90.9 | 90.9 | 90.9 | 90.8 | 91.1 |
| Particle Size - % < 2 μm | 99.4 | 91.7 | 93.3 | 93.5 | 94.2 | 92.0 |
| Particle Size - % < 0.25 μm | 67.5 | 18.8 | 20.7 | 22.0 | 26.3 | 21.0 |
| BET(m$^2$/g) | — | 15.4 | 15.7 | 15.6 | 16.1 | 11.5 |
| Brookfield @ 20 rpm (c.p.s.) | 200 | 350 | 325 | 300 | 300 | 335 |
| Hercules @ 18 dynes (rpm) | 4.5* | 220 | 230 | 340 | 500 | 880 |
| % Solids | 70 | 70.3 | 70.3 | 70.3 | 70.3 | 70 |
| Shape Factor | 16.4 | 15.4 | 14.2 | 13.7 | 12.5 | |
| Offset Coated Sheet Properties | | | | | | |
| % Coarse Kaolin Clay | | | 95% | 90% | 80% | |
| % Fine Kaolin Clay | | | 5% | 10% | 20% | |
| Brightness (G.E.) | | | 84.6 | 84.4 | 84.5 | 84.2 |
| Opacity | | | 93.6 | 93.8 | 93.7 | 93.6 |
| Gloss (75°) | | | 80.0 | 81.0 | 80.8 | 80.0 |

TABLE 4-continued

| Blend # | 1 | 2 | 3 | 4 |
|---|---|---|---|---|
| Print Gloss (20°) | | 47 | 48 | 44 | 44 |
| PPS 10 (μm) | | 0.87 | 0.84 | 0.84 | 0.82 |

*dynes @ 4400 rpm

As evident in Table 4, the blends of kaolin clays in offset coated sheet exhibited improved brightness, opacity, gloss, and print gloss when compared to the commercial coating clay. Also, the surface area of the pigment of the blends was greater than that of the commercial clay.

The kaolin clay pigment of the invention has a particle size distribution such that at least 90% by weight of the particles have an e.s.d. finer than 2 μm and less than 30% by weight having an e.s.d. finer than 0.25 μm. The ratio of % finer than 2 microns divided by the % finer than 0.25 micron is equal to or greater than 3.0. The surface area is at least 12.0 m²/g (BET method using nitrogen as adsorbent), preferably about 12.6 to 23, more preferably about 13 to 20, the Hercules viscosity is greater than 250 rpm at 18 dynes at a solids ranging from about 65% to 75% solids, and the shape factor is 12 or greater.

The kaolin clay pigment of the invention has been found to produce substantial advantages in opacification, glossing, smoothness, and printability in paper coating applications when compared to other commercial kaolin pigments. This composition has "good" fluidity at a high solids concentration (>69.1% solids) and at both high and low shear rates is highly desirable by papermakers because of enhanced productivity.

Whereas particular embodiments of the present invention have been described for purposes of illustration, it will be evident to those skilled in the art that numerous variations and details of the invention may be made without departing from the invention as defined in the appended claims.

What is claimed is:

1. A kaolin clay pigment for use in a coating formulation for paper, said kaolin clay pigment comprising kaolin clay having the following characteristics:
   (1) Particle Size (e.s.d. as determined by Sedigraph)
      (a) Particles less than 2 microns: greater than or equal to about 90%;
      (b) Particles less than 0.25 microns: about 30% or less; wherein the ratio:

$$\frac{\%\ \text{less than 2 microns}}{\%\ \text{less than 0.25 microns}} \geq 3;$$

(2) Particle shape factor: greater than or equal to about 12; and
   (3) Hercules viscosity: greater than or equal to about 250 rpm at 18 dynes/cm $10^{-5}$ when said kaolin is prepared as a slurry containing about 65% to about 75% solids.

2. A kaolin clay pigment of claim 1 wherein said kaolin clay comprises low-defect kaolinite and has a Hinckley Crystallinity Index about 0.6 or greater.

3. A kaolin clay pigment of claim 1 wherein said kaolin clay pigment comprises a coarse kaolin clay which has been subjected to a froth flotation step.

4. A kaolin clay pigment of claim 1 wherein said kaolin clay pigment comprises a coarse kaolin clay which has been subjected to a selective flocculation step.

5. A kaolin clay pigment of claim 1 wherein said kaolin clay pigment comprises a blend of a coarse kaolin clay pigment and a fine kaolin clay pigment, said fine kaolin clay pigment having the following characteristics prior to blending:
   (1) Particle Size (e.s.d. as determined by Sedigraph)
      (a) Particles less than 2 microns: about 90% to about 99.9%;
      (b) Particles less than 0.25 microns: about 50% to about 75%;
   (2) Particle Shape factor: less than 12.

6. A kaolin clay pigment of claim 5 wherein said fine kaolin clay comprises high-defect kaolinite having a Hinckley Crystallinity Index about 0.5 or less.

7. A kaolin clay pigment of claim 5 wherein said fine kaolin clay is blended with said coarse kaolin in amounts ranging from about 0.1 to about 30% by dry weight of said kaolin clay pigment.

8. A paper coated with the kaolin clay pigment of claim 1 having a brightness gain, and/or opacity gain, and/or print gloss gain, and/or a sheet gloss gain compared to Top Grade Commercial Pigment.

9. A paper coating formulation comprising a dispersed kaolin clay pigment comprising kaolin clay having the following characteristics:
   (1) Particle Size (e.s.d. as determined by Sedigraph)
      (a) Particles less than 2 microns: greater than or equal to about 90%;
      Particles less than 0.25 microns: about 30% or less; wherein the ratio:

$$\frac{\%\ \text{less than 2 microns}}{\%\ \text{less than 0.25 microns}} \geq 3;$$

(2) Surface area: greater than or equal to about 12.6 m²/g (BET method using $N_2$ as adsorbent);
   (3) Particle shape factor: greater than or equal to about 12; and
   (4) Hercules viscosity: greater than or equal to about 250 rpm at 18 dynes/cm $10^{-5}$ when said kaolin is prepared as a slurry containing about 65% to about 75% solids.

10. A paper coating of claim 9 wherein said kaolin clay pigment comprises a coarse kaolin clay that has been subjected to froth flotation.

11. A paper coating of claim 9 wherein said kaolin clay pigment comprises a coarse kaolin clay that has been subjected to selective flocculation.

12. A paper coating of claim 9 wherein said kaolin clay pigment comprises a blend of a coarse kaolin clay pigment and a fine kaolin clay pigment, said fine kaolin clay pigment having the following characteristics prior to blending:
   (1) Particle Size (e.s.d. as determined by Sedigraph)
      (a) Particles less than 2 microns: about 90% to about 99.9%;
      (b) Particles less than 0.25 microns: about 50% to about 75%; and
   (2) Particle Shape factor: less than about 12.

13. A paper coating of claim 12 wherein said fine kaolin clay is blended with said coarse kaolin in amounts ranging from about 0.1 to about 30% by dry weight of said kaolin clay pigment.

14. A paper coating of claim 13 wherein said coarse kaolin clay comprises low-defect kaolinite having a Hinckley Crystallinity Index about 0.6 or greater and wherein said fine kaolin clay comprises high-defect kaolinite and has a Hinckley Crystallinity Index 0.5 or less.

15. A method for producing a kaolin clay pigment of claim 5 comprising:

a) blunging in water a coarse crude kaolin clay containing a low defect kaolinite having a Hinckley Crystallinity Index about 0.6 or greater to form an aqueous slurry having a solids level of from about 50% to about 70% by weight of said slurry;

b) removing particles larger than about 45 microns from said slurry;

c) removing impurities from said clay slurry;

d) classifying said clay slurry according to particle size distribution (p.s.d.) such that about 89% to about 97% by weight of the particles in said slurry have an equivalent spherical diameter (e.s.d.) less than about 2 microns;

e) delaminating said clay slurry to produce a clay having a p.s.d. such that greater than or equal to about 90% by weight of the particles in said clay slurry have an e.s.d. less than about 2 microns;

f) defining said clay slurry to produce a coarse fraction and a fine fraction; and g) discarding said fine fraction of (f);

h) blending a fine kaolin clay with said coarse fraction of (f) to produce a kaolin clay pigment having a shape factor greater than or equal to about 12.

16. The method of claim 15 wherein said fine kaolin clay added in (h) has the following characteristics prior to blending:
(1) Particle Size (e.s.d. as determined by Sedigraph)
(a) Particles less than 2 microns: about 90% to about 99.9%;
(b) Particles less than 0.25 microns: about 50% to about 75%; and
(2) Particle Shape factor: less than about 12.

17. The method of claim 16 wherein said fine kaolin clay is blended with said coarse clay wherein said fine kaolin clay comprises about 0.1% to about 30% by weight of the total kaolin clay pigment.

18. A method of in claim 17 wherein said fine kaolin clay is comprised of high-defect kaolinite having a Hinckley Crystallinity Index about 0.5 or less.

19. A kaolin clay pigment of claim 1 having the following characteristic:
(4) Surface area: greater than or equal to about 12.6 m²/g (BET method using $N_2$ as adsorbent).

20. A paper coating of claim 9 wherein said kaolin clay pigment comprises a coarse kaolin clay that has been subjected to magnetic separation.

21. A kaolin clay pigment of claim 1 wherein said kaolin clay pigment comprises substantially all coarse kaolin clay.

22. A kaolin clay pigment of claim 5 wherein said fine kaolin clay comprises about 0.1% to about 30% by weight of said total kaolin clay pigment.

23. The kaolin clay pigment of claim 22, wherein said fine kaolin clay comprises about 20% by weight of said total kaolin clay pigment.

24. The kaolin clay pigment of claim 22, wherein said fine kaolin clay comprises about 10% by weight of said total kaolin clay pigment.

25. The kaolin clay pigment of claim 22, wherein said fine kaolin clay comprises about 5% by weight of said total clay pigment.

26. A kaolin clay pigment of claim 21 or claim 5, wherein said Hercules viscosity is about 500 rpm at 18 dynes/cm $10^{-5}$ when said kaolin is prepared as a slurry containing about 65% to about 75% solids.

27. A kaolin clay pigment of claim 21 or claim 5, wherein said particle shape factor of the overall pigment is about 12 to about 25.

28. The kaolin clay pigment of claim 27, wherein said particle shape factor of the overall pigment is about 13 to about 18.

29. The kaolin clay pigment of claim 28, wherein said particle shape factor of the overall pigment is about 15.

30. A paper coating formulation of claim 9 wherein said kaolin clay pigment comprises substantially all coarse kaolin clay.

31. A paper coating of claim 9 wherein said kaolin clay pigment comprises a coarse kaolin clay that has been subjected to magnetic separation.

32. A paper coating of claim 9 wherein said surface area is from about 13 to about 23 m²/g (BET method using $N_2$ as adsorbent).

33. A paper coating of claim 32 wherein said surface area is from about 14 to about 20 m²/g (BET method using $N_2$ as adsorbent).

34. A paper coating of claim 9, said Hercules viscosity is about 500 rpm at 18 dynes/cm $10^{-5}$ when said kaolin is prepared as a slurry containing about 65% to about 75% solids.

35. The method of claim 17 herein said fine kaolin clay is blended with said coarse clay such that said fine kaolin clay comprises about 20% by weight of the total kaolin clay pigment.

36. The method of claim 17 wherein said fine kaolin clay is blended with said coarse clay such that said fine kaolin clay comprises about 10% by weight of the total kaolin clay pigment.

37. The method of claim 17 wherein said fine kaolin clay is blended with said coarse clay such that said fine kaolin clay comprises about 5% by weight of the total kaolin clay pigment.

38. A method for producing a kaolin clay pigment of claim 21 comprising:

a) blunging in water a coarse crude kaolin clay containing a low defect kaolinite having a Hinckley Crystallinity Index about 0.6 or greater to form an aqueous slurry having a solids level of from about 50% to about 70% by weight of said slurry;

b) removing particles larger than about 45 microns from said slurry;

c) removing impurities from said clay slurry;

d) classifying said clay slurry according to particle size distribution (p.s.d.) such that about 89% to about 97% by weight of the particles in said slurry have an equivalent spherical diameter (e.s.d.) less than about 2 microns;

e) delaminating said clay slurry to produce a clay having a shape factor greater than or equal to about 12;

f) defining said clay slurry to produce a coarse fraction and a fine fraction; and g) discarding said fine fraction of (f), such that said coarse fraction comprises about 30% or less by weight particles having an e.s.d. less than about 0.25 microns.

39. The method of claim 38, wherein a dispersant is used during said blunging referred to in (a).

40. The method of claim 15, wherein a dispersant is used during said blunging referred to in (a).

41. A paper coated with a kaolin clay pigment of claim 1 having a brightness gain, as compared to Top Grade Commerical Pigment, from about 0.1 unit to about 2 units; an opacity gain, as compared to Top Grade Commercial Pigment, from about 0.1 unit to about 1.0 unit; a print gloss gain (750°), as compared to Top Grade Commercial Pigment from about 0.1 unit to about 8 units; a sheet gloss gain, as compared to Top Grade Commercial Pigment, from about 0.1 unit to about 4 units.

* * * * *

UNITED STATES PATENT AND TRADEMARK OFFICE
CERTIFICATE OF CORRECTION

PATENT NO. : 6,402,826 B1
DATED : July 2, 2002
INVENTOR(S) : Yuan et al.

It is certified that error appears in the above-identified patent and that said Letters Patent is hereby corrected as shown below:

Column 15,
Line 59, after "Index", insert -- of --.

Column 16,
Line 12, after "Index", insert -- of --.
Line 65, after "Index", insert -- of about --.

Column 17,
Line 35, after "method of", delete "in".
Line 37, after "Index", insert -- of --.

Column 18,
Line 15, after "claim 9,", insert -- wherein --.
Line 19, "herein" should read -- wherein --.
Lines 59 and 61, after "Pigment," insert -- of --.
Line 62, "(750°)" should read -- (75°) --.
Line 62, after "Pigment", insert -- ,of --.
Line 64, after "Pigment," insert -- of --.

Signed and Sealed this

Twenty-fifth Day of March, 2003

JAMES E. ROGAN
*Director of the United States Patent and Trademark Office*

Disclaimer

6,402,826 B1—Jun Yuan, Millegeville; Christopher R. L. Golley, Sandersville, both of GA (US); Christopher Nutbeem, Cornwall (GB); Rajan R. Iyer, Sandersville, GA (US); William H. Pope, Sandersville, GA (US); William L. Garforth, Sandersville, GA (US); Anthony V. Lyons, Macon, GA (US); Robert J. Pruett, Milledgeville, GA (US). KAOLIN CLAY PIGMENT FOR PAPER COATING AND METHOD FOR PRODUCING SAME. Patent dated June 11, 2002. Disclaimer filed May 20, 2005 by Assignee, Imerys Pigments, Inc..

Hereby enters this disclaimer to claims 1-4, 8-11, 19-21, 26-34, 38-39 and 41 of said patent.

*(Official Gazette, September 20, 2005)*

UNITED STATES PATENT AND TRADEMARK OFFICE
CERTIFICATE OF CORRECTION

PATENT NO. : 6,402,826 B1  Page 1 of 1
DATED : June 11, 2002
INVENTOR(S) : Jun Yuan et al.

It is certified that error appears in the above-identified patent and that said Letters Patent is hereby corrected as shown below:

Column 10,
Line 38, "5,576,616" should read -- 5,576,617 --.

Signed and Sealed this

Twentieth Day of December, 2005

JON W. DUDAS
*Director of the United States Patent and Trademark Office*